United States Patent [19]

Holt

[11] 4,168,758

[45] Sep. 25, 1979

[54] ELECTRICALLY ASSISTED PEDAL-PROPELLED VEHICLES

[75] Inventor: William D. Holt, Colne, England

[73] Assignee: Lucas Industries Limited, Birmingham, England

[21] Appl. No.: 700,896

[22] Filed: Jun. 29, 1976

[30] Foreign Application Priority Data

Jul. 3, 1975 [GB] United Kingdom ............... 27956/75

[51] Int. Cl.² .............................................. B62M 7/00
[52] U.S. Cl. ................................... 180/206; 180/220; 200/61.12; 280/214
[58] Field of Search ...................... 180/33 C, 34, 65 A; 280/214; 200/61.12, 61.39

[56] References Cited

U.S. PATENT DOCUMENTS

| 2,546,610 | 3/1951 | Pacurar | 200/61.12 |
| 3,264,639 | 8/1966 | Lerman et al. | 200/61.39 X |
| 3,426,303 | 2/1969 | Buckner | 200/61.39 X |
| 3,569,927 | 3/1971 | Guyton et al. | 200/61.39 X |
| 3,622,722 | 11/1971 | Jackson et al. | 200/61.39 |
| 3,773,131 | 11/1973 | Jaulmes | 180/34 |

Primary Examiner—Joseph F. Peters, Jr.
Assistant Examiner—Donn McGiehan
Attorney, Agent, or Firm—Holman & Stern

[57] ABSTRACT

An electrically assisted pedal power vehicle includes a rotation sensing arrangement sensing the direction of rotation of a rotary drive member in the pedal propulsion mechanism of the vehicle. The rotation sensing arrangement includes a pair of switches actuable by means on the drive member. The switches control a monostable circuit such that the circuit produces an output pulse only when the switches are actuated in the correct order. A frequency to voltage converter may be driven by the monostable circuit with a Schmidt trigger sensitive to the output of the converter controlling the electric drive motor.

8 Claims, 5 Drawing Figures

ELECTRICALLY ASSISTED PEDAL-PROPELLED VEHICLES

BACKGROUND OF THE INVENTION

This invention relates to electrically assisted pedal-propelled vehicles such as an electrically assisted pedal bicycle.

It is an object of the invention to provide such a vehicle with a convenient form of electric motor control.

SUMMARY OF THE INVENTION

An electrically assisted pedal propelled vehicle in accordance with the invention has an electric motor for assisting propulsion of the vehicle, a pedal propulsion mechanism including at least one rotary drive member and an electronic motor control circuit controlling said drive motor and sensitive to rotation of said rotary drive member, said control circuit causing the motor to be energised when the drive member is rotated by the pedal propulsion mechanism in a forward drive direction, but causing the motor to be de-energised when the drive member is stationary or rotated in the reverse direction.

Preferably the motor control means includes a pair of switches and an operating member for said switches, either the switches or the operating member being mounted on the drive member and the other being mounted on a fixed part.

The two switches are preferably adjacent one another and the control circuit is sensitive to the order of actuation of the switches.

The control circuit may also include means for preventing energisation of the motor when the frequency of operation of the switches is below a predetermined level.

BRIEF DESCRIPTION OF A PREFERRED EMBODIMENT

Figure 1:
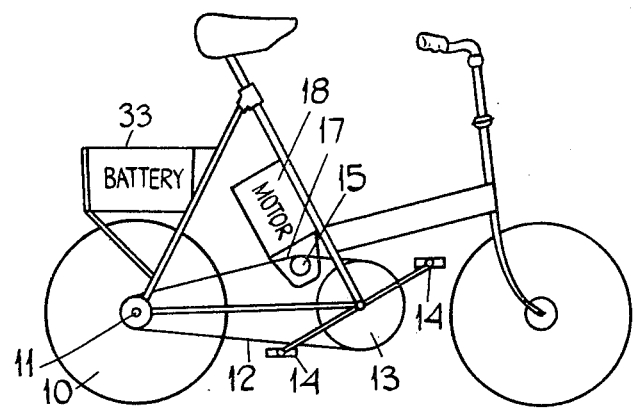
FIG. 1 is a diagrammatic view of one example of an electrically assisted pedal bicycle.
Figure 2:
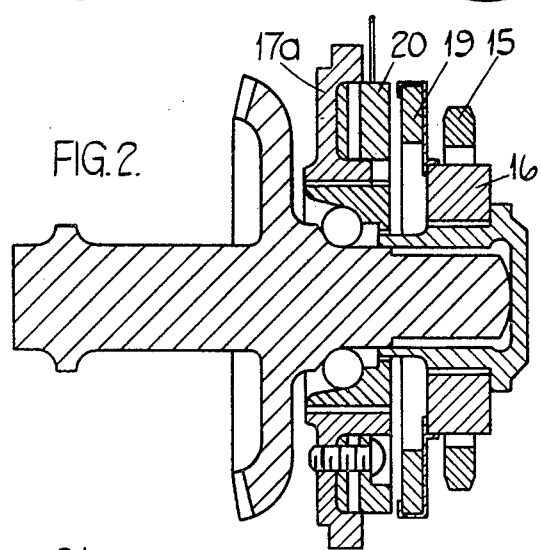
FIG. 2 is an enlarged detail view of part of an electrical motor drive assembly.
Figure 3:
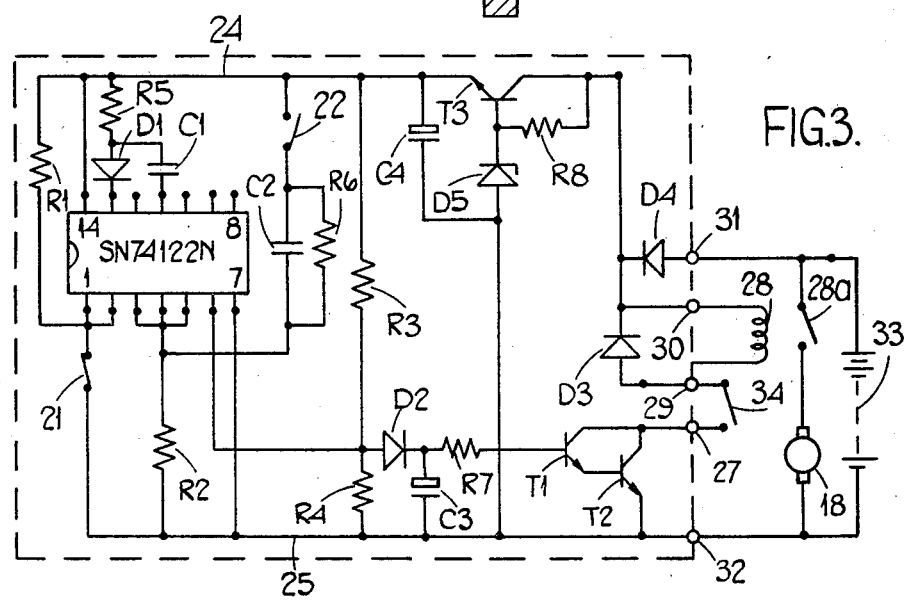
FIG. 3 is the circuit diagram of a motor control circuit for the bicycle.

The bicycle shown in FIG. 1 has a rear wheel 10 with a sprocket 11 coupled by a chain 12 to a chain wheel 13 having pedals 14. The chain is also coupled to a rotary drive member in the form of a sprocket 15 coupled by a freewheel 16 (see FIG. 2) and a gearbox 17 to an electric motor 18.

Figure 5:
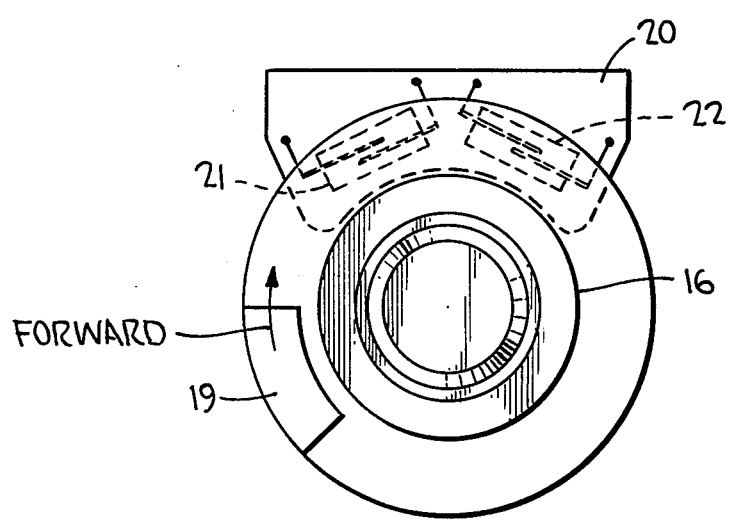

Mounted on the outer race of the freewheel 16 is a switch operating member 19 in the form of a magnet. This magnet coacts with a pair of magnetically operable reed switches 21, 22 forming part of an encapsulated electrical control circuit 20 mounted on a fixed part of the bicycle, namely the cover 17a of the gearbox 17. As may be seen in FIG. 5 the switches 21, 22 are so disposed that as the sprocket 15 (not shown but mounted on freewheel 16) rotates in a forward drive direction (indicated by the arrow) the switch 21 is made, the switch 22 is made, the switch 21 opens and the switch 22 opens successively.

The circuit includes an integrated circuit re-triggerable monostable multivibrator 23 which may be a Texas Instruments SN 74122N integrated circuit device. This device is supplied in a 14 pin dual-in-line package, and the pin designations used hereinafter are those employed in the manufacturer's data sheet for the device. The A1 and A2 data input pins are connected together and via a resistor $R_1$ to a rail 24. The $B_1$, $B_2$ and CLEAR pins are connected together and via a resistor $R_2$ to a rail 25. The $\overline{Q}$ output pin is connected to the junction of two resistors $R_3$, $R_4$ in series between the rails 24, 25. The GROUND pin is connected to the rail 25 and the VCC pin is connect to the rail 24. The REXT pin is connected to the cathode of a diode $D_1$, the anode of which is connected to the rail 24 via a resistor $R_5$. The CEXT pin is connected via a capacitor $C_1$ to the anode of the diode $D_1$. The remaining pins are unconnected. The switch 21 is connected between the rail 25 and the $A_1$, $A_2$ data input pins. The switch 22 is connected at one side to the rail 24 and at the other side by a resistor $R_6$, bridged by a capacitor $C_2$, to the $B_1$, $B_2$ data input pins.

The SN 74122N circuit includes a logic circuit such that the output at the $\overline{Q}$ output pin is low whilst switch 21 alone is closed, but goes high when switch 22 closes and then remains high for a predetermined time dependent on the values of $R_5$, $C_1$ unless the switch 21 closes again during this interval. If, on the other hand switch 22 closes first, the circuit is not triggered and the $\overline{Q}$ output remains low.

The junction of the resistors $R_3$, $R_4$ is connected to the anode of a diode $D_2$ the cathode of which is connected to one side of a capacitor $C_3$ the other side of which is connected to the rail 25. A resistor $R_7$ connects the cathode of the diode $D_2$ to the base of the input transistor $T_1$ of an n-p-n Darlington pair $T_1$, $T_2$ with the emitter of transistor $T_2$ connected to rail 25 and the common collectors of the pair connected to an output terminal 27. Also included in the encapsulated control circuit 20 is a freewheel diode $D_3$ for a relay coil 28, the diode $D_3$ being connected between two terminals 29, 30 of the circuit.

For supplying power to the circuit, it has terminals 31, 32. The terminal 32 is connected directly to the rail 25 and the terminal 31 is connected to the anode of a protection diode $D_4$, the cathode of which is connected to the terminal 30 and also to collector of an n-p-n transistor $T_3$ having its emitter connected to the rail 25. A resistor $R_8$ connects the collector of transistor $T_3$ to the base thereof, which base is connected to the cathode of a zener diode $D_5$ with its anode connected to rail 25. A capacitor $C_4$ is connected between the rails 24, 25. The transistor $T_3$, zener diode $D_4$, resistor $R_8$ and capacitor $C_4$ provide a regulated supply for the integrated circuit.

In use the terminals 31, 32 are connected to the + and − terminals of a battery 33 and a switch 34 on the bicycle handlebars (or elsewhere) is connected between the terminals 27, 29. The motor 18 is connected in series with a normally open relay contact 28a.

When the rider wishes to be power assisted he closes the switch 34. When he pedals forwardly, forward rotation of the sprocket 15 is sensed by the control circuit so that the relay 28 is energised and the motor provides extra forward drive power.

If the pedals are not operated or are used to turn the sprocket 11 backwards (e.g. for gear changing or braking), the relay is not energised.

The diode $D_2$, the capacitor $C_3$ and the resistor $R_7$ provide a smoothing action so that the relay is not de-energised, during the relatively short periods when switch 21 alone is closed.

The circuit shown in FIG. 4 again utilises a retriggerable monostable integrated circuit type SN 74122N 123, but in this case the connections to the device are somewhat different. The $A_1$, $A_2$ data input terminals are connected together and, by a resistor $R_{101}$, to the positive rail 124. The $A_1$ and $A_2$ terminals are also connected by a resistor $R_{102}$ in series with the first switch 121 to earth, i.e. to the rail 125, the resistor $R_{102}$ being bridged by a capacitor $C_{101}$. The $B_1$ and $B_2$ data input terminals are connected together and via a resistor $R_{103}$ to the rail 124. The $B_1$ and $B_2$ terminals are also connected by the second switch 122 to the rail 125. The CLEAR terminal of the circuit 123 is connected to the junction of two resistors $R_{104}$ and $R_{105}$ connected in series between the rails 124, 125, the resistors $R_{104}$ and $R_{105}$ being chosen so that the voltage at their junction is lower than the voltage at the junction of the resistors $R_{101}$ and $R_{102}$ when the switch 121 has been closed for a sufficiently long period for the capacitor $C_{101}$ to become fully charged, i.e. so that $$R_{102}:(R_{101}+R_{102}) > R_{105}:(R_{104}+R_{105})$$

As before the rail 124 is connected to the $R_{EXT}$ terminal by a resistor $R_{106}$ and a diode $D_{101}$ in series and the $C_{EXT}$ terminal is connected to the junction of the resistor $R_{106}$ and the anode of the diode $D_{101}$ by a capacitor $C_{102}$. The output of the multivibrator is taken in this case from the Q output terminal of the circuit 123.

When both switches 121 and 122 are open the Q output is low. When switch 121 closes, the voltage on the $A_1$ and $A_2$ terminals goes lower than that on the CLEAR terminal for a time determined by the values of the resistor $R_{101}$ and the capacitor $C_{101}$, and since the signal at the $B_1$ and $B_2$ terminals at this time is high, the output at the Q output terminal goes high. The subsequent closing of the switch 122 has no effect and the Q high output remains for a time determined by the resistor $R_{106}$ and the capacitor $C_{102}$, say 30 mS. Similarly opening of the two switches has no effect even if these events occur within this output pulse length.

If, on the other hand switch 122 closes before switch 121 no output pulse will occur, since an output pulse can only be produced when the signal at the B terminals goes high whilst that at the A terminals is low, or when the signal at the A terminals goes low whilst that at the B terminals is high. Neither of these conditions is met during reverse rotation.

The output of the multivibrator is applied via a coupling capacitor $C_{103}$ to a frequency to voltage converter circuit consisting of resistors $R_{107}$, $R_{108}$, diodes $D_{102}$, $D_{103}$ and a capacitor $C_{104}$. The resistor $R_{107}$ connects the capacitor $C_{103}$ to the anode of the diode $D_{103}$ and to the cathode of the diode $D_{102}$ which has its anode connected to the rail 125. The capacitor $C_{104}$ and the resistor $R_{108}$ are connected in parallel between the cathode of the diode $D_{103}$ and the rail 125. The charging time constant of the resistor $R_{107}$ and the capacitor $C_{104}$ is an order of magnitude greater than the output pulse length of the circuit 123, and the discharging time constant of the resistor $R_{108}$ and the capacitor $C_{104}$ is a further order of magnitude higher. Thus the average voltage on the capacitor $C_{104}$ will increase with the frequency at which pulses appear from the multivibrator 123.

The frequency to voltage converter drives a Schmidt trigger circuit built around two n-p-n transistors $T_{101}$ and $T_{102}$. A resistor $R_{109}$ connects the cathode of the diode $D_{103}$ to the base of the transistor $T_{101}$ which has its collector connected to the rail 124 by a resistor $R_{110}$. The collector of the transistor $T_{101}$ is also connected to the rail 125 by two resistors $R_{111}$ and $R_{112}$ in series, with their junction connected to the base of the transistor $T_{102}$. The collector of the transistor $T_{102}$ is connected by a resistor $R_{113}$ to the rail 124 and its emitter is connected by two variable resistors in series to the rail 125. The common point of the variable resistors $VR_1$ and $VR_2$ is connected to the emitter of the transistor $T_{101}$ so that the turn on and turn off input voltages of the trigger circuit can be adjusted utilising the two variable resistors $VR_1$ and $VR_2$.

The collector of the transistor $T_{102}$ is connected to the cathode of a zener diode $D_{104}$ the anode of which is connected by a resistor $R_{114}$ to the rail 125. The anode of the zener diode $D_{104}$ is also connected to the base of a transistor $T_{103}$ connected as a Darlington pair with a transistor $T_{104}$. The emitter of the transistor $T_{104}$ is connected to the rail 125 and its collector is connected via the relay winding 128, a protective diode $D_{105}$ and a manually operable switch 129 in series to a 12 volt supply terminal 130 also connected via a voltage regulator arrangement 131 to the rail 124. The motor 132 is connected in series with the relay contacts across a 24 volt supply.

In use, the motor 132 is energised whenever the switches 121, 122 are operated in the correct order at a frequency sufficient to trigger the Schmidt trigger circuit. Preferably, the circuit shown in FIG. 4 is used in a vehicle in which the drive connection between the motor and the drive wheel or wheels of the vehicle is independent of the pedal drive mechanism.

Figure 4:
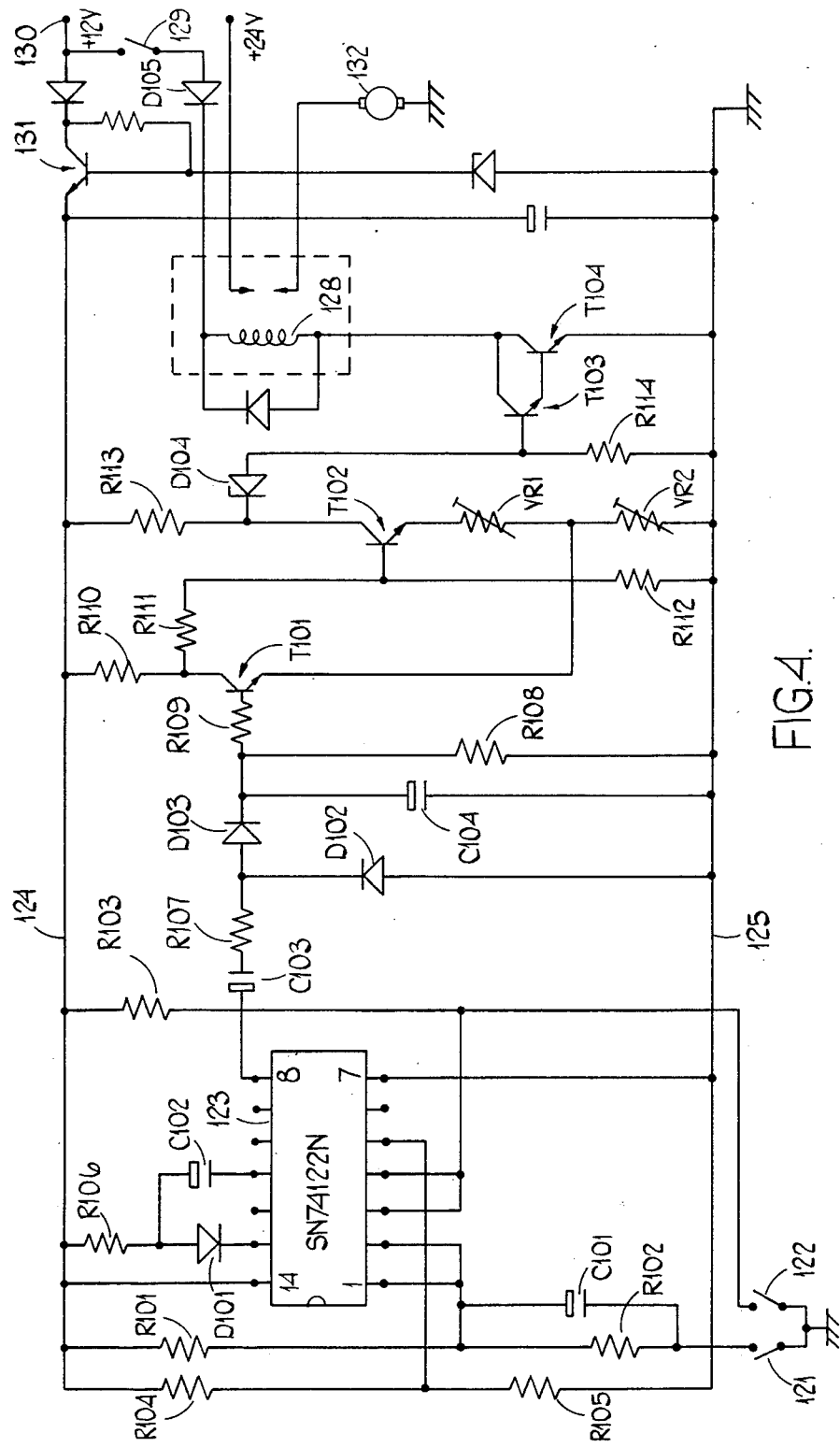
FIG. 4 is a circuit diagram of another embodiment of the motor control circuit and FIG. 5 is an operational view of one embodiment.

In the case of the circuit shown in FIG. 4 there may be two or several magnets for actuating the switches 121, 122 instead of just one, and moreover these may be associated with the chainwheel rather than with the sprocket.

I claim:

1. An electrically assisted pedal-propelled vehicle having an electric motor for assisting propulsion of the vehicle, at least one rotary drive member and an electronic motor control circuit controlling said drive member and sensitive to rotation of said rotary drive member, said circuit causing the motor to be energized when the drive member is rotated in a forward drive direction, but causing the motor to be de-energized when the drive member is stationary or rotated in the reverse direction, said control circuit comprising at least two switches fixably mounted relative to said rotary drive member, means for operating said switches in response to movement of said rotary drive member, said switches responsive to said means for operating said switches and providing a signal indicative of the direction of movement of said rotary drive member, and means for providing an output when said signal indicates movement of the rotary drive member in the forward direction.

2. A vehicle as claimed in claim 1 in which the switches are magnetic reed switches and the means for operating said switches is a magnet.

3. A vehicle as claimed in claim 2 in which the extent of the magnet is such, in relation to the diposition of the switches, that both switches are closed at one angular position of the drive member, rotation of the drive member in one direction causing one switch to open before the other and rotation of the drive member in the opposite direction causing said one switch to open after the other.

4. A vehicle as claimed in claim 2, in which the motor control circuit also includes a retriggerable monostable circuit having a first data input controlled by one switch, a second data input controlled by the other switch and an output terminal at which an output signal only appears when said other switch closes whilst said one switch is already closed.

5. A vehicle as claimed in claim 4 in which the motor control circuit comprises a relay having contacts controlling the motor and a drive circuit connecting the output terminal of the retriggerable monostable circuit to the relay winding, said drive circuit including smoothing means for preventing intermittent switching off of the relay during rotation of said drive member.

6. A vehicle as claimed in claim 2 in which said means for providing an output provides an output pulse each time the switches are actuated in the required order and the control circuit includes means sensitive to the frequency of said pulses for preventing energisation of the motor when the frequency is less than a predetermined level.

7. A vehicle as claimed in claim 6 in which the frequency sensitive means comprises a frequency to voltage converter connected to a Schmidt trigger circuit.

8. A vehicle as claimed in claim 2 in which the control circuit also includes a retriggerable monostable circuit having a first data input controlled by one switch, a second data input controlled by another switch and a resistor/capacitor arrangement associated with said first data input ensuring that the circuit produces an output pulse on closing of said one switch only when the other switch is open.

* * * * *